United States Patent [19]
Yamasaki

[11] Patent Number: 5,745,740
[45] Date of Patent: Apr. 28, 1998

[54] PARALLEL PROCESSING COMPUTER SYSTEM, CONSTITUENT UNITS FOR USE THEREIN, AND CLOCK TUNING METHOD FOR A PARALLEL PROCESSING COMPUTER SYSTEM

[75] Inventor: Shinichi Yamasaki, Yokohama, Japan

[73] Assignee: Fujitsu Limited, Kawasaki, Japan

[21] Appl. No.: 661,827

[22] Filed: Jun. 11, 1996

[30] Foreign Application Priority Data

Oct. 6, 1995 [JP] Japan ................................ 7-260540

[51] Int. Cl.⁶ ............................................... G06F 1/04
[52] U.S. Cl. ........................... 395/551; 395/553; 395/558
[58] Field of Search ............................... 395/551, 553, 395/558, 182.1

[56] References Cited

U.S. PATENT DOCUMENTS

| | | | |
|---|---|---|---|
| 4,714,924 | 12/1987 | Ketzler | 340/825.21 |
| 5,235,566 | 8/1993 | Merrill | 368/113 |
| 5,455,931 | 10/1995 | Camporese et al. | 395/556 |

OTHER PUBLICATIONS

Abstracts of Japan, 06-250982, Laid-Open Date, Sep. 9, 1994, I. Horiba, et al., Phase Locked Loop for Plural Processor.

*Primary Examiner*—Dennis M. Butler
*Attorney, Agent, or Firm*—Staas & Halsey

[57] ABSTRACT

A technique for making it possible to complete, within a shorted period of time, clock tuning processing which is performed for constituent units in a parallel processing computer system. In each of the constituent units, a tuning scan loop is formed by continuously connecting together a plurality of clock tuning latches. A non-volatile memory is provided for previously storing clock tuning data inherent to each constituent unit. A plurality of constituent units which are to be subjected to clock tuning processing are simultaneously designated by a service processor. In each designated constituent unit, the clock tuning data stored in the non-volatile memory are successively sent and written into the respective clock tuning latches.

14 Claims, 10 Drawing Sheets

PARALLEL PROCESSING COMPUTER SYSTEM, CONSTITUENT UNITS FOR USE THEREIN, AND CLOCK TUNING METHOD FOR A PARALLEL PROCESSING COMPUTER SYSTEM

BACKGROUND OF THE INVENTION

1) Field of the Invention

The present invention relates to a technique for controlling clock tuning processing in a parallel processing computer system including a number of constituent units such as processor elements in which clock tuning for the respective constituent units is performed by a service processor.

Conventional computer systems have responded to user demands by improving the performance of a central processing unit (CPU) itself. However, from the technical viewpoint, it becomes difficult to fully satisfy growing user demands simply by improving the performance of the central processing unit itself. Therefore, a parallel processing computer has recently come to play an increasingly important role in meeting such demands.

The parallel processing computer is made up of several to several hundreds of computers (processors) called processor elements (hereinafter abbreviated to PE). The PEs are connected together so as to be able to communicate with one another, thereby constituting a single computer system. Since each PE can individually perform its own processing, the entire system can perform parallel processing so as to improve the overall performance.

In the parallel processing computer system comprising several hundreds PEs, as the number of PEs increases, it takes an enormous amount of time to complete a clock tuning operation. This results in an increased start-up time before the computer system starts its ordinary operation after the power has been turned on, which in turn wastes valuable computer resources and prevents convenient operation of the system.

For these reasons, it is desired to reduce the time required to execute clock tuning operation in the parallel processing computer system consisting of many PEs.

2) Description of the Related Art

Each of various units forming a computer system, such as a PE, is made up of a plurality of boards. Each board receives a clock from a clock generator such as an oscillator. By virtue of this clock, the plurality of boards operate synchronously. However, each board has its own characteristics, and generally, a difference in timing of operation is produced among the different boards, even if the boards have an identical circuit configuration.

To eliminate this difference in timing, each board is provided with a clock tuning latch. As a result of predetermined clock tuning data corresponding to the characteristics of each board being set for each clock tuning latch, a difference in timing is prevented from being produced, so that all the boards can operate at the same timing in accordance with the clock. Consequently, the overall computer system operates properly in a synchronized manner using a single clock.

As mentioned above, the setting of predetermined clock tuning data for the respective clock tuning latches is called clock tuning processing. This clock tuning processing is usually executed in the following manner during the period from when the power is turned on to when the computer system starts its ordinary operation.

Specifically, in each of the units forming the computer system, one loop (a tuning scan loop) is established by continuously connecting together the clock tuning latches provided on the respective boards. Clock tuning data to be set to each latch are fed and shifted to each of the latches in the order in which the latches are connected via the tuning scan loop. As a result of repeatedly executing this processing, the clock tuning data are loaded properly into the latches.

At this time, the clock tuning data for each unit are previously stored in the form of a file in a hard disk (hereinafter abbreviated to HD) connected to a service processor (hereinafter abbreviated to SVP) which performs control for the maintenance and operation of the computer system. Each unit requires different clock tuning data and different tuning procedures. For this reason, the SVP reads clock tuning data for each unit from the HD and then executes the above described clock tuning processing.

Since the clock tuning data are stored as a file in the HD controlled by the SVP, it is possible to easily rewrite and modify the clock tuning data. In the computer system, each constituent unit, such as a PE, is upgraded to the newest version in order to overcome design problems or in order to improve its functions. Eventually, the number of clock tuning latches and associated clock tuning data are also changed. As previously mentioned, the clock tuning data are held in the HD, and hence it is possible to easily cope with the above mentioned modifications.

An ordinary computer system is made up of several to several tens of different units, including PEs and peripheral equipment. As previously mentioned, the clock tuning processing is executed for each constituent unit. Accordingly, the time required to carry out the clock tuning processing varies depending on the number of units. Since the number of units in such an ordinary computer system is not very large, a problem, e.g., a time delay in starting up the system rarely arises, that is, a delay in the period from when the power is turned on to when the system starts its ordinary operation.

However, in the case of a parallel processing computer system comprising several hundreds of PEs, if the above described clock tuning processing is carried out for each PE, it takes a length of time proportionate to the number of PEs to completely carry out the clock tuning operations. In other words, it takes an enormous amount of time to complete the clock tuning processing. As a result, the time required to start up the computer system, from when the power is turned on to when the computer system starts its ordinary operation, is prolonged to a much greater extent, which in turn wastes valuable computer resources and prevents the system from being operated in a convenient way.

Further, it is necessary to store clock tuning data for each HD controlled by the SVP, and therefore as the number of PEs increases the memory space of the HD occupied by the clock tuning data becomes enormous. Consequently, it becomes difficult to effectively utilize the HD.

SUMMARY OF THE INVENTION

The present invention is conceived to solve these problems of the prior art, and the primary object of the present invention is to make it possible to complete clock tuning processing within a shorter period of time, thereby shortening the start-up time of a computer system while effectively using the computer resources.

To this end, according to one aspect of the present invention, there is provided a parallel processing computer system having a plurality of constituent units which include a processing unit and a service processor for carrying out control for maintenance and operation of these constituent units. Each of the constituent units comprises a tuning scan loop formed as a result of continuously connecting together a plurality of clock tuning latches into which predetermined clock tuning data are set; a non-volatile memory into which the clock tuning data inherent to each constituent unit is stored in advance; and a connecting mechanism which responds to an instruction from the service processor so as to connect the non-volatile memory to the tuning scan loop and successively send the clock tuning data from the non-volatile memory to the tuning scan loop. The service processor is provided with a broadcast designating mechanism for simultaneously designating a plurality of constituent units which are to be subjected to clock tuning processing.

According to another aspect of the present invention, there is provided a constituent unit for use in a parallel processing computer system which acts as one of elements constituting the parallel processing computer system. The constituent unit comprises a tuning scan loop formed as a result of continuously connecting together a plurality of clock tuning latches into which predetermined clock tuning data are set; a non-volatile memory into which the clock tuning data inherent to the constituent unit is stored; and a connecting mechanism which responds to an instruction from the service processor so as to connect the non-volatile memory to the tuning scan loop and successively send the clock tuning data from the non-volatile memory to the tuning scan loop.

According to another aspect of the present invention, there is provided a clock tuning method for a parallel processing computer system which has a plurality of constituent units including a processing unit, and a service processor for carrying out control for maintenance and operation of these constituent units. In the method, there are provided, in each of the constituent units, a tuning scan loop formed as a result of continuously connecting together a plurality of clock tuning latches into which predetermined clock tuning data are set; a non-volatile memory into which the clock tuning data inherent to each constituent unit is stored in advance. A plurality of constituent units to be subjected to clock tuning processing is designated simultaneously by the service processor. The clock tuning data are successively sent from the non-volatile memory to the respective clock tuning latches which form the tuning scan loop.

In this way, according to the present invention, it is possible for the service processor to simultaneously designate a plurality of constituent units to be subjected to clock tuning processing, whereby each of the designated constituent units reads corresponding clock tuning data from the non-volatile member, and sets the thus read clock tuning data to the respective clock tuning latches forming the tuning scan loop. The respective constituent units can execute clock tuning processing in parallel using different clock tuning data. As a result, it becomes possible to complete the clock tuning processing within a constant period of time (equal to the time that is necessary for one constituent unit to execute the clock tuning processing) irrespective of the number of constituent units. Therefore, the time required to execute the clock tuning processing, that is, the time required to start up the computer system, is considerably reduced, and hence it becomes possible to very effectively utilize computer resources. Further, it becomes unnecessary for the service processor to hold clock tuning data items the number of which corresponds to the number of constituent units. As a result, it becomes possible to effectively utilize a recording medium of the service processor.

DESCRIPTION OF THE PREFERRED EMBODIMENT (A) Aspect of the Present Invention

Figure 1:
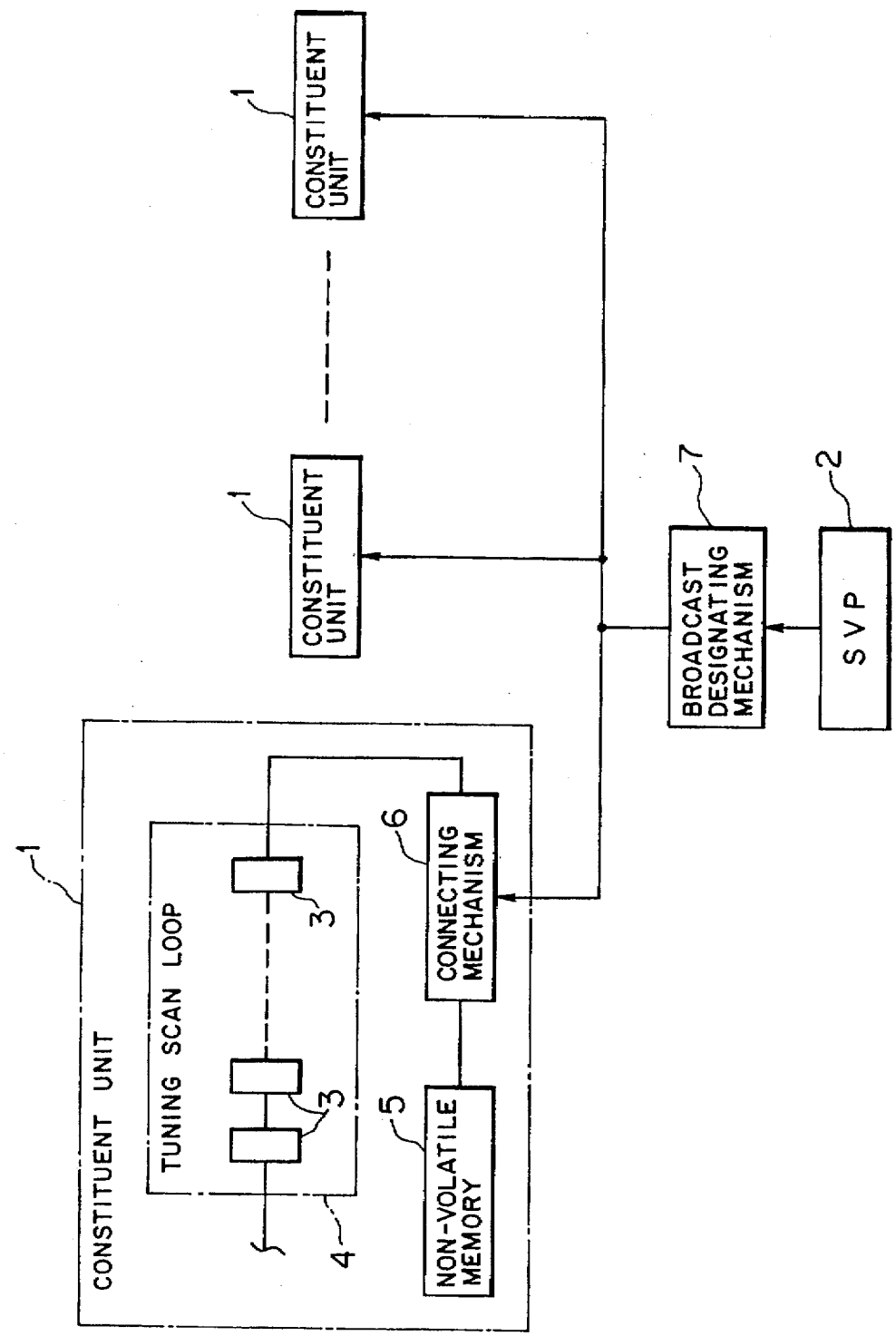
FIG. 1 is a block diagram showing an aspect of the present invention.

FIG. 1 is a block diagram showing an aspect of the present invention. As shown in FIG. 1, a parallel processing computer system of the present invention is made up of a plurality of constituent units 1 such as processor elements (PEs), and a service processor (SVP) 2 for carrying out control for the maintenance and operation of the constituent units 1.

Within each constituent unit 1, a plurality of clock tuning latches 3, into which predetermined clock tuning data are to be set, are serially connected together, thereby forming a tuning scan loop 4. Further, the constituent unit 1 is provided with a non-volatile memory 5 into which clock tuning data inherent to the constituent unit 1 is stored in advance, and a connecting mechanism 6 which connects the non-volatile memory 5 to the tuning scan loop 4 when the constituent unit 1 is designated by the SVP 2, and which successively sends the clock tuning data from the non-volatile memory 5 to the tuning scan loop 4.

The SVP 2 is provided with a broadcast designating mechanism 7 for simultaneously designating a plurality of constituent units 1 to be subjected to clock tuning processing.

In the above-described parallel processing computer system, a plurality of constituent units 1 to be subjected to clock tuning processing are simultaneously designated by means of the broadcast designating mechanism 7 of the SVP 2. In each of the designated constituent units 1, the connecting mechanism 6 successively reads the clock tuning data from the non-volatile memory 5, and then writes the thus read clock tuning data into the respective clock tuning latches 3 that form the tuning scan loop 4.

In this way, it is possible for the SVP 2 to simultaneously instruct the plurality of constituent units 1 to read out the clock tuning data from the non-volatile memory 5 and send them to the respective clock tuning latches 3 forming the tuning scan loop 4. The clock tuning processing that uses clock tuning data differing among the constituent units 1 can be executed in parallel. As a result, it is possible to complete the clock tuning processing within a constant period of time irrespective of the number of constituent units 1. Further, it becomes unnecessary for the SVP 2 to hold clock tuning data items the number of which corresponds to the number of constituent units 1.

The parallel processing computer system may have the following structure. A tuning file is previously stored in a recording medium controlled by the SVP 2. The tuning file includes unit designating information representing those constituent units 1, among the constituent units 1, which are to have their clock tuning data rewritten, and clock tuning data for rewriting the data of constituent units 1 corresponding to the unit designating information (hereinafter the clock tuning data for rewriting is also referred to as "rewrite clock tuning data"). The SVP 2 is provided with a data replacement instruction mechanism for instructing the constituent unit 1 designated by the unit designating information to replace the clock tuning data read from the non-volatile memory 5 and latched in the respective clock tuning latches 3 with the rewrite clock tuning data for the corresponding constituent unit 1 stored in the tuning file. Upon reception of the data replacement instruction, the connecting mechanism 6 of each of the designated constituent unit 1 successively sends the rewrite clock tuning data from the tuning file of the SVP 2 to the tuning scan loop 4.

In this case, after the clock tuning data read from the non-volatile memory 5 have been written into the respective clock tuning latches 3 of each constituent unit 1, the data replacement instruction mechanism of the SVP 2 issues a data replacement instruction to the constituent units 1 corresponding to the unit designating information in the tuning file. In the constituent unit 1 which has received the data replacement instruction, the clock tuning data read from the non-volatile memory 5 and latched in the respective clock tuning latches 3 is replaced with the rewrite clock tuning data for the corresponding constituent unit 1 stored in the tuning file.

The recording medium of the SVP 2 holds clock tuning data items, the number of which corresponds to the number of constituent units 1, and the unit designating information on the constituent units 1 to which the clock tuning data are to be written. After the clock tuning processing has been completed, that is, after the predetermined clock tuning data read from the non-volatile memory 5 have been latched in the respective clock tuning latches 3, the SVP 2 searches the tuning file within the recording medium. The constituent units 1 designated by the unit designating information in the tuning file are again subjected to the clock tuning processing, whereby the clock tuning data of those constituent units 1 are replaced with rewrite clock tuning data. Consequently, it is not necessary for the SVP 2 to hold tuning files the number of which corresponds to the number of constituent units 1, and it is also possible to inherit the advantages of the prior art, that is, it is possible to quickly and readily cope with modifications of the clock tuning data.

It is possible to previously store in the recording medium controlled by the SVP 2 a unit version information file related to version numbers of the respective constituent units 1. In this case, the SVP 2 may group the plurality of constituent units 1 according to the version number of each constituent unit 1 stored in the unit version information file, and the broadcast designating mechanism 7 may be activated so as to simultaneously designate the constituent units 1 on a group-by-group basis.

When the clock tuning data are written into the tuning scan loop consisting of the clock tuning latches, it is necessary to shift the clock tuning data, taking into consideration the loop length (the number of clock tuning latches). In the prior art, the tuning operation is carried out for each constituent unit 1. Hence, even if the loop length changes as a result of a change in the version number of the constituent unit 1, it is possible to carry out the tuning processing taking account of the changed loop length of each constituent unit 1. However, as previously mentioned, in the case of the parallel processing computer system comprising the plurality of constituent units 1, it takes a very long time to carry out the tuning processing of the constituent units one by one.

To solve this problem, as previously mentioned, the SVP 2 identifies the version number of the respective constituent units 1 and groups the constituent units 1 according to their version numbers. The broadcast designating mechanism 7 carries out the clock tuning processing of the constituent units 1 for each group. As a result, even when the computer system comprises constituent units 1 of different versions which have different numbers of clock tuning latches, it is possible to complete the clock tuning processing within a short period of time.

Further, the non-volatile memory 5 of a plurality of the constituent units 1 may have an identical capacity larger than the volume of the clock tuning data to be written into the tuning scan loop 4. In this case, the clock tuning data may be arranged and stored in the non-volatile memory 5 of each constituent unit 1 such that they follow dummy data disposed at the leading end of a data area of the non-volatile memory 5 from which reading of data is started.

It is generally necessary for the loop scan circuit to pass data through a loop taking its length into consideration, because it is necessary to pass only target data through the loop while reserving the remaining data. However, in the case of the tuning scan loop 4 consisting of only the clock tuning latches 3, it is only necessary to write predetermined clock tuning data into the respective clock tuning latches 3 as initial values.

Therefore, the present invention utilizes these special characteristics of the tuning scan loop 4. When the clock tuning data read from the non-volatile memory 5 are directly written into the tuning scan loop 4, the volume of the non-volatile memory 5 and a memory location into which the data are stored are set in the same manner previously mentioned. This makes it possible to carry out the clock tuning processing by simply shifting the tuning clock data by the maximum effective length (capacity) of the non-volatile memory 5.

As a result, it becomes completely unnecessary for the SVP 2 to allow for a difference in the loop length due to a difference in the versions. Therefore, even if there exist constituent units 1 of different versions which comprise different numbers of clock tuning latches in the computer system, it is possible to always complete the clock tuning processing within a constant period of time.

According to the present invention, as described in detail, it is possible for the SVP 2 to simultaneously instruct the plurality of constituent units 1 to read out the clock tuning data from the non-volatile memory 5 and subsequently set them to the respective clock tuning latches 3 forming the tuning scan loop 4 of each of the designated constituent units 1. The clock tuning processing that uses clock tuning data differing among the constituent units 1 can be executed in parallel. It is also possible to complete the clock tuning processing within a constant period of time (equal to the time that is necessary for one constituent unit 1 to complete clock tuning processing) irrespective of the number of constituent units 1. Therefore, the clock tuning processing time, that is, the time required to start up the computer system, is reduced considerably, which in turn makes it possible to very effectively utilize computer resources. Further, it becomes unnecessary for the SVP 2 to hold clock tuning data items the number of which corresponds to the number of constituent units 1. As a result, the recording medium of the SVP 2 can be effectively utilized.

In the case where the computer system is arranged in such a way that the recording medium of the SVP 2 holds the tuning file, and that the clock tuning data of the specific constituent units 1 can be rewritten after the clock tuning data read from the non-volatile memory 5 have been written into the clock tuning latches of the constituent units, it becomes unnecessary for the recording medium of the SVP 2 to have tuning files the number of which corresponds to the number of constituent units 1. Further, it is possible to inherit the advantage of the prior art, that is, it is possible to quickly and readily cope with modifications of the clock tuning data. As previously mentioned, it is also possible to implement both the effective utilization of computer resources obtained as a result of a reduction in the time required to start up the computer system, and effective utilization of the recording medium of the SVP 2.

(B) Embodiment of the Present Invention

Figure 2:
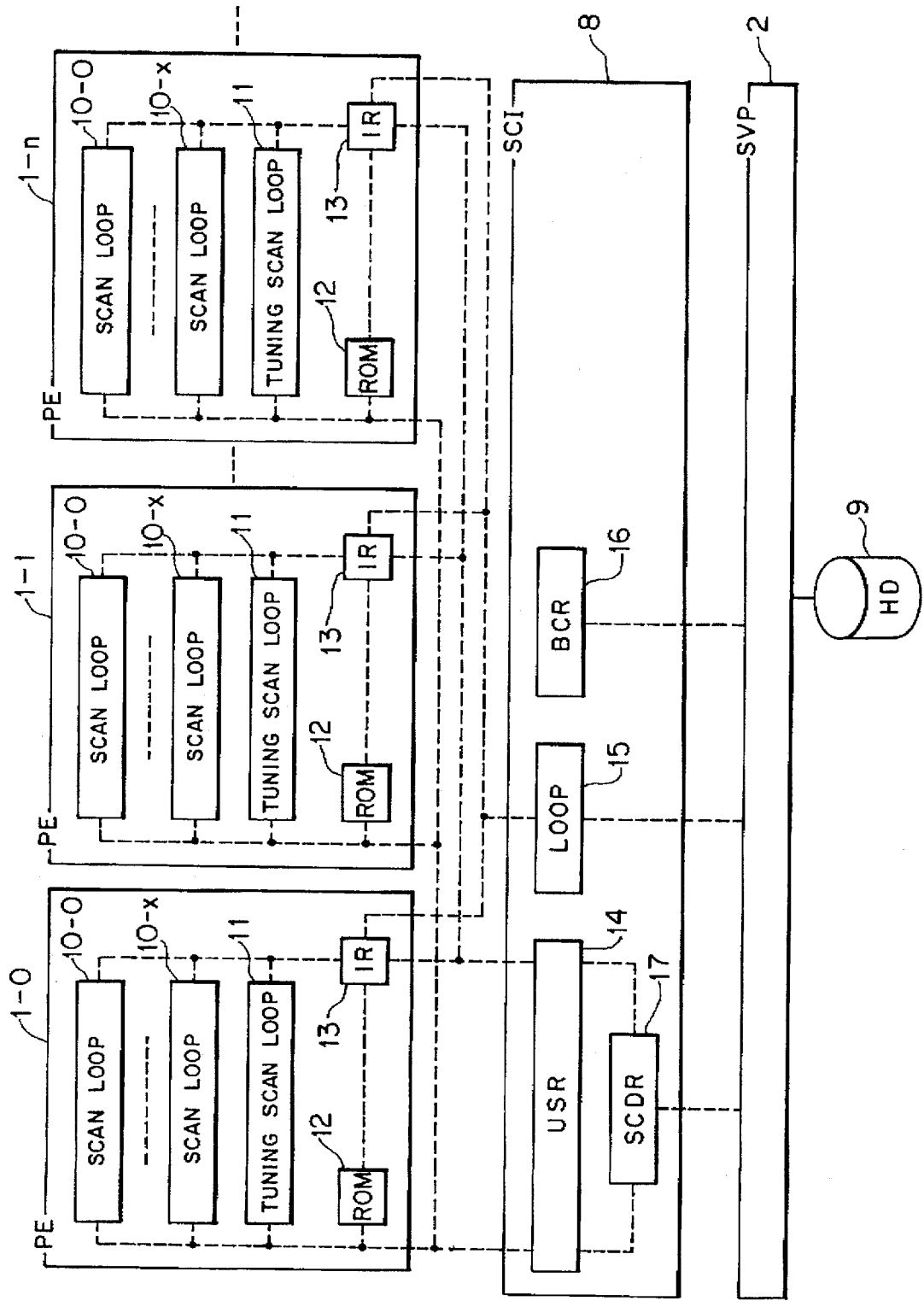
FIG. 2 is a block diagram showing an example of the configuration of a parallel processing computer system and constituent units for use therein according to one embodiment of the present invention.

FIG. 2 is a block diagram showing an example of the configuration of a parallel processing computer system and constituent units used therein according to one embodiment of the present invention. As shown in FIG. 2, the parallel processing computer system according to the present embodiment comprises PEs (constituent units) 1-0 to 1-n, the SVP 2 for carrying out control for the maintenance and operation of the computer system which includes the PEs 1-0 to 1-n, a system control interface (hereinafter abbreviated to SCI) 8 interposed between the PEs 1-0 to 1-n and the SVP 2, and a hard disk (HD) 9 which is connected to the SVP 2 as a recording medium under control of the SVP 2.

Each of PEs 1-0 to 1-n comprises a plurality of scan loops (loop scanning circuits) 10-0 to 10-x, and a tuning scan loop 11 formed as a result of serially connecting together a plurality of clock tuning latches (not shown in FIG. 2 but designated by 3 in FIG. 1) into which predetermined clock tuning data are to be set.

Each of the PEs 1-0 to 1-n is further provided with a ROM (a non-volatile memory) 12 into which clock tuning data inherent to each PE are stored in advance, and an instruction register (hereinafter abbreviated to IR) 13 which operates upon receipt of an instruction from the SVP 2 via the SCI 8.

The ROM 12 has a storage capacity larger than the length (the number of clock tuning latches) of the tuning scan loop 11.

The IR 13 controls data input to, and output from, the plurality of scan loops 10-0 to 10-x and the tuning scan loop 11 in response to an instruction (a value set in a register of the SCI 8) from the SVP 2. Particularly, in the present embodiment, the IR 13 connects the ROM 12 to the tuning scan loop 11 upon receipt of an instruction for the clock tuning processing from the SVP 2. Then, the IR 13 successively sends the clock tuning data from the ROM 12 to the tuning scan loop 11. Thus, the IR 13 serves as a connecting mechanism.

It is possible for the SVP 2 to control the states of the scan loop 10-0 to 10-x and the tuning scan loop 11 within each of the PEs 1-0 to 1-n via the SCI 8.

The SCI 8 acts as an interface between the SVP 2 and each of the PEs 1-0 to 1-n. Various registers 14–17, which will be described later, are provided within the SCI 8. It is possible to control the selection of units provided within the computer system, such as SCI 8 and PEs 1-0 to 1-n, and control data sent to or received from the thus selected unit by setting proper values into the registers 14 to 17 using the SVP 2.

The SCI 8 is provided with a unit select register (hereinafter abbreviated to USR) 14, a loop select register (hereinafter abbreviated to LOOP) 15, a shift counter (hereinafter abbreviated to BCR (Byte Control Register)) 16, and a scan data register (hereinafter abbreviated to SCDR) 17.

The USR 14 arbitrarily designates or selects a PE from the PEs 1-0 to 1-n to be controlled by the SVP 2. A predetermined value is set to a predetermined bit in the USR 14 before the SVP 2 controls the PEs 1-0 to 1-n, which permits the simultaneous control of the plurality of PEs 1-0 to 1-n. In other words, the USR 14 of the present embodiment acts as a broadcast designating mechanism for simultaneously designating the plurality of PEs 1-0 to 1-n to be subjected to clock tuning processing. The USR 14 implements an inter-unit broadcast, in which the plurality of PEs 1-0 to 1-n are simultaneously designated.

The LOOP 15 arbitrarily selects one scan loop from the plurality of scan loops 10-0 to 10-x and the tuning scan loop 11 in the PE selected from the PEs 1-0 to 1-n by the USR 14, according to a value set by the SVP 2. The IR 13 in the selected PE controls data input to and output from the scan loop which corresponds to the value set in the LOOP 15.

The BCR 16 receives an amount of data shift from the SVP 2, when data input/output are performed for the scan loops 10-0 to 10-x and the tuning scan loop 11 through the IR 13. The amount of data shift is set by the SVP 2.

The SCDR 17 temporarily holds the data to be written from the SVP 2 to the respective scan loops 10-0 to 10-x and the tuning scan loop 11 of PEs 1-0 to 1-n, and data read from the respective scan loops 10-0 to 10-x and the tuning scan loop 11 of PEs 1-0 to 1-n.

The IR 13 of the PE which the USR 14 has selected from the PEs 1-0 to 1-n connects the SCDR 17 to a scan loop corresponding to the value set in the LOOP 15. The data corresponding to the length of the scan loop to be connected are set in the BCR 16 as a shift amount when scan-in and scan-out operations are executed with respect to the scan loop to be connected.

The SCI 8 shifts the data of the scan loop (selected by the LOOP 15) in the PE selected from PEs 1-0 to 1-n by the USR 14, according to the data set to the BCR 16. Then, the SCI 8 receives data from, or outputs data to, each scan loop via the SCDR 17.

In the case of the scan-in operation, scan-in data are set to the SCDR 17, and the data are shifted into a scan loop selected by the USR 14 and the LOOP 15. As a result, the SVP 2 sets predetermined data in a target latch. On the other hand, in the case of the scan-out operation, the data of a scan loop selected by the USR 14 and the LOOP 15 are shifted out to the SCDR 17. The data read by the SCDR 17 are sent to the SVP 2, whereby the SVP 2 obtains the data for the target latch.

In the parallel processing computer system according to the present embodiment, the USR 14 simultaneously selects and designates the plurality of PEs 1-0 to 1-n, and sets the IRs 13 of the respectively selected PEs 1-0 to 1-n (or some or all of the selected PEs) so as to connect the ROMs 12 mounted on the respective PEs 1-0 to 1-n with the tuning scan loop 11. It is possible to execute the clock tuning processing of the plurality of PEs 1-0 to 1-n concurrently and in parallel.

The tuning file 18 (FIGS. 4 and 5) and the unit version information file 19 (FIG. 6) are stored in the HD 9 under the control of the SVP 2. The SVP 2 can refer to or rewrite the contents of these files 18 and 19.

The tuning file 18 holds the unit designating information on the PE which is to have its clock tuning data rewritten, and clock tuning data for rewriting purposes corresponding to the unit designating information. As a result of suitable values being set in the respective registers 14 to 17 of the SCI 8 from the SVP 2, a data replacement instruction is provided to the PE corresponding to the PE information in the tuning file 18. In other words, the clock tuning data of the ROM 12 set in the tuning scan loop 11 are replaced with the clock tuning data for rewriting which are provided for that PE in the tuning file 18. Specifically, the data replacement instructing mechanism is implemented by means of the registers 14 to 17 of the SCI 8 in the present embodiment. In the PE that has received the data replacement instruction, the IR 13 successively sends the clock tuning data for rewriting provided from the SCI 8 (the SVP 2) to the tuning scan loop 11. Details of these operations will be described with reference to FIGS. 4 and 5.

The unit version information file 19 holds version number information for each of PEs 1-0 to 1-n. Referring to the unit version information file 19, the SVP 2 groups the PEs 1-0 to 1-n according to a version number, allowing for a version number of each of PEs 1-0 to 1-n. The unit version information file 19 sets the SCI 8 so that it simultaneously designates the PEs on a group-by-group basis. This operation will be described in detail with reference to FIG. 6.

With reference to FIGS. 3 to 10, the operation of the parallel processing computer system having the above described configuration of the present embodiment will be described in more detail.

Figure 3:
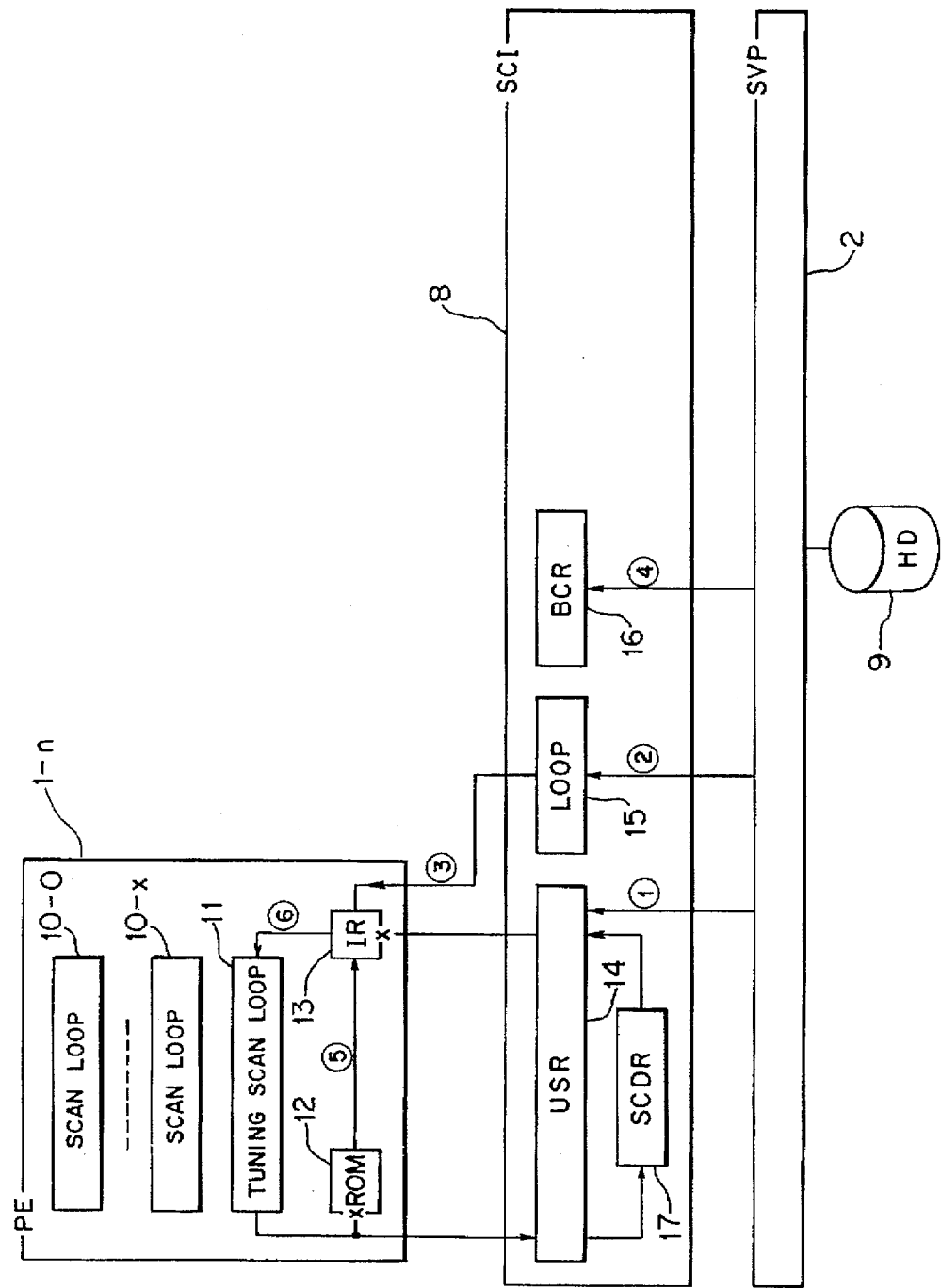
FIG. 3 is a block diagram for explaining the concept of clock tuning processing according to the embodiment of the present invention in which data stored in a ROM are used.

FIG. 3 is a block diagram for explaining the concept of the clock tuning processing which is carried out by each of PEs 1-0 to 1-n using the data of the ROM 12. FIG. 3 shows only the PE 1-n, and the other PEs are omitted from the drawing. However, the clock tuning processing is carried out in the same manner as in the other PEs.

The SVP 2 sets data used for selecting all of PEs 1-0 to 1-n which form the computer system in the USR 14 within the SCI 8 (designated by arrow ① shown in FIG. 3). The SVP 2 further sets in the LOOP 15 within the SCI 8 data used for causing the IR 13 of each of PEs 1-0 to 1-n to output the data from the ROM 12 to the tuning scan loop 11 (designated by arrow ② shown in FIG. 3).

The data set in the LOOP 15 are distributed to the respective IRs 13 of the PEs selected from PEs 1-0 to 1-n by the USR 14 (designated by arrow ③ shown in FIG. 3). The IR 13 of each of PEs 1-0 to 1-n connects the tuning scan loop 11 of each PE to the ROM 12.

The SVP 2 subsequently sets the shift amount, which corresponds to the length of the tuning scan loop 11, in the BCR 16 within the SCI 8 (designated by arrow ④ shown in FIG. 3). Then, the SVP 2 instructs the SCI 8 to shift the data into the tuning scan loop 11. Upon receipt of this instruction, the SCI 8 shifts the data from the ROM 12 to the tuning scan loop 11 of each of PEs 1-0 to 1-n, according to the data set in the BCR 16.

As a result, the clock tuning data are shifted from the ROM 12 into the tuning scan loop 11 via the IR 13 in all of the PEs 1-0 to 1-n selected by the USR 14 (designated by arrows ⑤ and ⑥ (shown in FIG. 3). Clock tuning processing of the PEs 1-0 to 1-n are carried out concurrently and in parallel, that is, the clock tuning data which are inherent to each PE and are stored in the ROM 12 mounted on each PE are shifted into the tuning scan loop 11.

In this way, as a result of the inter-unit broadcast, it is possible to concurrently carry out the clock tuning processing using the data of the ROM 12 provided in each of the PEs 1-0 to 1-n. The clock tuning processing of the parallel processing computer system comprising a plurality of identical processing units (PEs) can be carried out concurrently, using the data which differ from PE to PE.

Consequently, it becomes possible to make a time delay in the clock tuning processing carried out during the course of starting up the computer system constant. That is, the time delay from when a power switch is turned on to when the computer system starts its ordinary operation can be reduced to a certain period of time equal to the period of time required for a single processing element to carry out the clock tuning processing. As a result, the time required to start up the computer system is considerably reduced, which in turn makes it possible to very effectively utilize computer resources.

It becomes unnecessary for the HD 9 under control of the SVP 2 to retain clock tuning data items the number of which corresponds to the number of PEs 1-0 to 1-n. As a result, memory space in the HD 9 can be effectively utilized.

Figure 4:
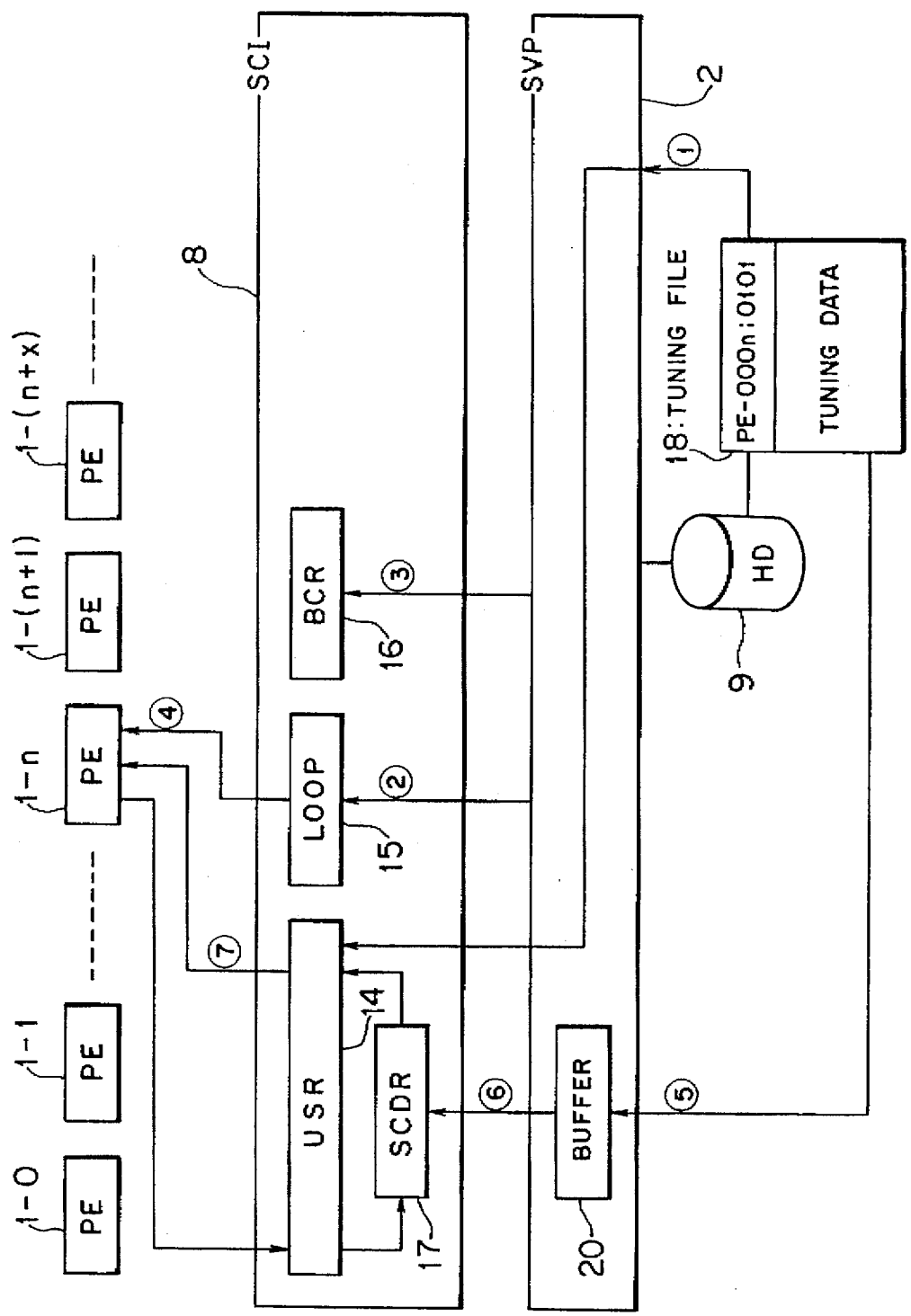
FIGS. 4 and 5 are block diagrams for explaining the concept of the clock tuning processing according to the embodiment of the present invention in which tuning files of a service processor is used.
Figure 5:
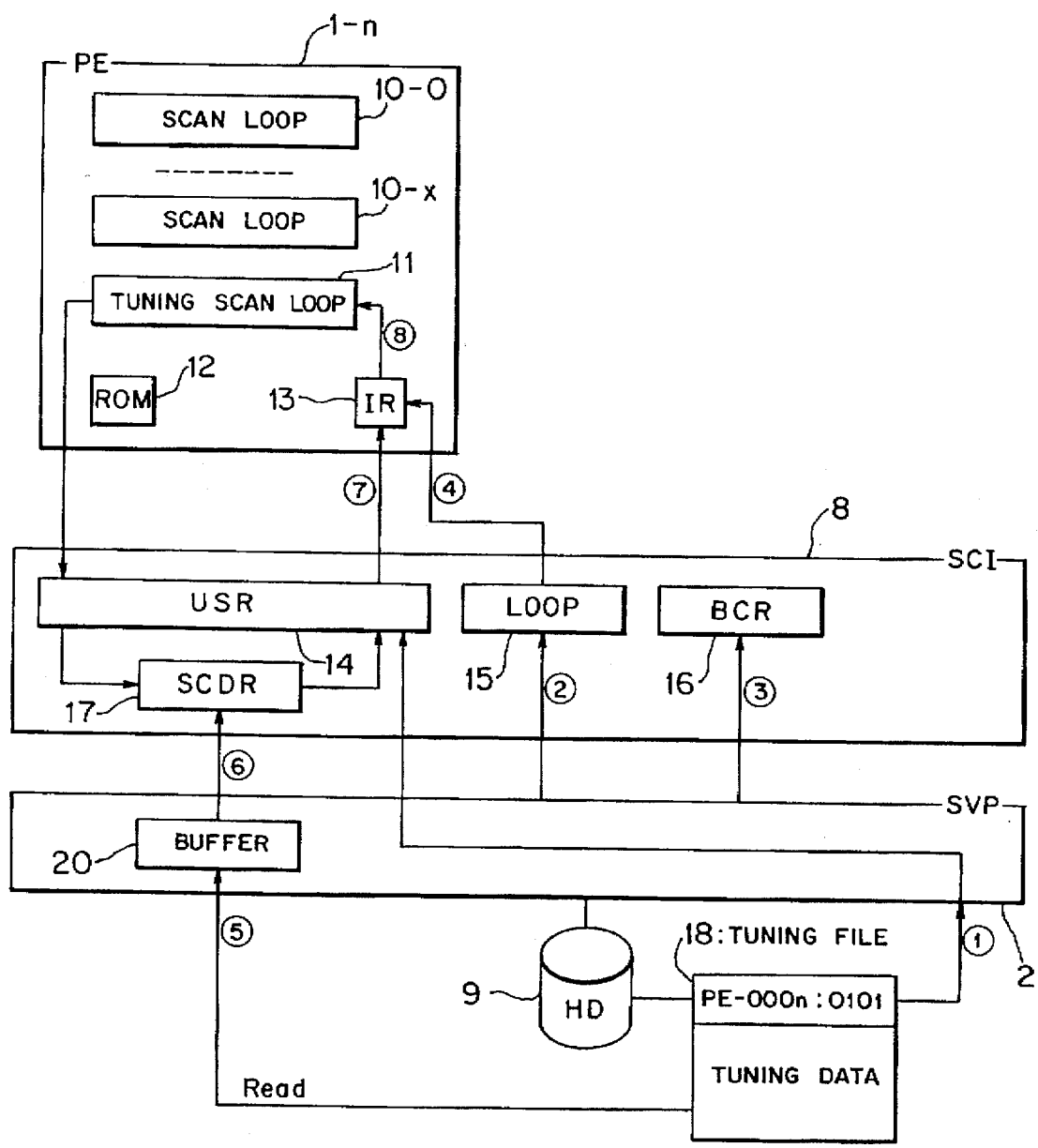

FIGS. 4 and 5 are block diagrams for explaining the concept of the clock tuning processing which is performed for a specific PE 1-n in accordance with the information read from the tuning file 18 by the SVP 2. FIG. 4 shows PE 1-(n+1) and PE 1-(n+x) in addition to PEs 1-0 to 1-n. In the following descriptions, an explanation will be given of the case where PE 1-n is subjected to the clock tuning processing. For this reason, FIG. 5 only shows PE 1-n to be subjected to the clock tuning processing, and the other PEs are omitted from the drawing. Further, the detailed construction of each PE is omitted from FIG. 4.

After the clock tuning processing has been carried out concurrently in the plurality of PEs 1-0 to 1-n, using the data of the ROM 12 of each PE by means of the inter-unit broadcast, as previously described with reference to FIG. 3, the SVP 2 refers to the tuning file 18 within the HD 9 under control of the SVP 2.

A plurality of tuning files 18 exist within the HD 9, and each tuning file 18 holds unit designation information, and associated tuning data. After having confirmed that the tuning file 18 is effective, data used for selecting an individual PE (PE 1-n in the present embodiment) are set in the USR 14 within the SCI 8 according to the unit designating information in the tuning file 18 (designated by arrow ① shown in FIGS. 4 and 5).

Thereafter, the SVP 2 stores, into the LOOP 15 within the SCI 8, the data used for causing the IR 13 in the PE 1-n to output the data from the SCDR 17 to the tuning scan loop 11 (designated by arrow ② shown in FIGS. 4 and 5), and the shift amount corresponding to the length of the tuning scan loop 11 is set in the BCR 16 in the SCI 8 (designated by arrow ③ shown in FIGS. 4 and 5).

The data set in the LOOP 15 are distributed to the IR 13 of the PE 1-n selected by the USR 14 (designated by arrow ④ shown in FIGS. 4 and 5), and the IR 13 of this PE 1-n connects the tuning scan loop 11 to the SCDR 17.

The SVP 2 temporarily stores the data read from the clock tuning data of the tuning file 18 into a buffer 20 in the SVP 2 (designated by arrow ⑤ (shown in FIGS. 4 and 5). After having informed the SCI 8 of the leading address of the buffer 20, the SVP 2 instructs the SCI 8 to shift the data into the tuning scan loop 11.

Based on the received leading address, the SCI 8 successively sets the clock tuning data read from the buffer 20 of the SVP 2 in the SCDR 17 (designated by arrow ⑥ shown in FIGS. 4 and 5). The clock tuning data are shifted into the tuning scan loop 11 in a unit amount of the SCDR 17 (designated by arrow ⑦ shown in FIGS. 4 and 5 and arrow ⑧ shown in FIG. 5). If the clock tuning data are shifted in the unit amount of the SCDR 17, the value of the BCR 16 is deducted simply from the shift amount.

Similar processing (i.e., the shifting of the clock tuning data into the tuning scan loop in the unit amount of the SCDR 17) is repeatedly carried out until the value of the BCR 16 becomes zero. As a result, it becomes possible to individually carry out the clock tuning processing of the single PE 1-n in accordance with the information in the clock tuning data held in the clock tuning file 18.

At this time, PEs other than the PEs which are to have their clock tuning data rewritten have already been subjected to the clock tuning processing by means of the inter-unit broadcast. Therefore, it is only necessary for a specific PE, which corresponds to the effective file 18 of the tuning files 18 in the HD 9, to be individually subjected to the clock tuning processing, whereby the clock tuning processing of the parallel processing computer system is completed.

Thus, it is not necessary for the HD 9 under control of the SVP 2 to have tuning files 18 the number of which corresponds to the number of PEs, which makes it possible to carry out clock tuning processing for each of PEs which have their clock tuning data rewritten. For this reason, it becomes possible to quickly and readily change the clock tuning data without wasting the capacity of the HD 9.

Figure 6:
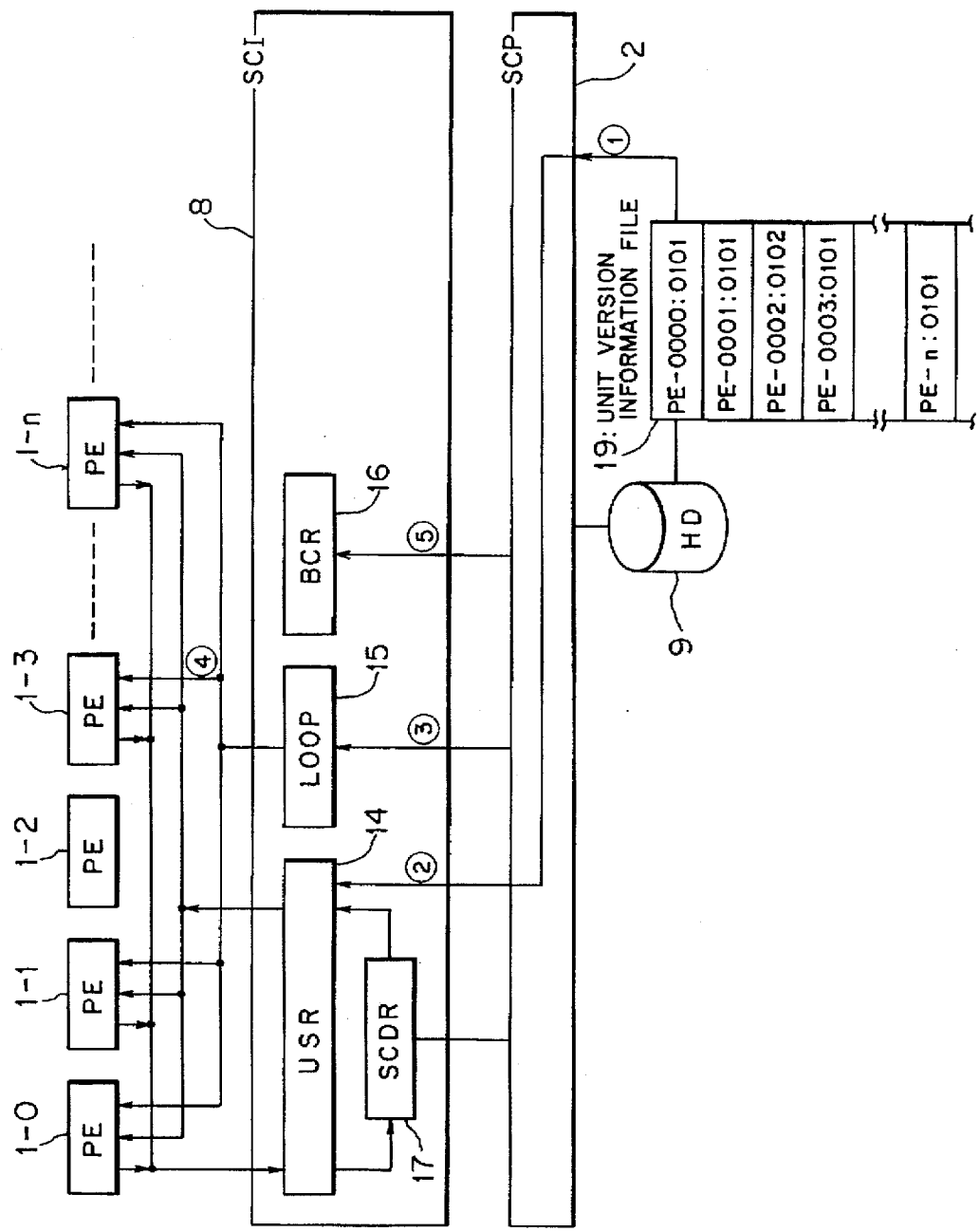
FIG. 6 is a block diagram for explaining the concept of the clock tuning processing according to the embodiment of the present invention in which a unit version information file of the service processor is used.

FIG. 6 is a block diagram for explaining the concept of the clock tuning processing which uses the unit version information file 19 of the SVP 2. FIG. 6 shows the concept of the clock tuning processing carried out on a group-by-group basis when the computer system comprises a mixture of PEs 1-0 to 1-n of different versions whose tuning scan loops 11 have different lengths. The detailed configuration of each of PEs 1-0 to 1-n is omitted from FIG. 6.

Prior to starting the clock tuning processing, the SVP 2 groups PEs having the identical version number (that is, the PEs having the same loop lengths), referring to the information on the version numbers of PEs 1-0 to 1-n in the unit version information file 19 previously prepared and stored in the HD 9 (designated by arrow ① shown in FIG. 6). The thus grouped PEs are extracted by the SVP 2. In the case of, for example, the unit version information file 19 shown in FIG. 6, the version numbers of PEs 1-0, 1-1, 1-3, . . . , 1-n are all "0101" and thus identical with each other.

The SVP 2 sets in the USR 14 of the SCI 8 the data used for selecting all of PEs 1-0, 1-1, 1-3, . . . , 1-n included in the same group (designated by arrow ② shown in FIG. 6). Further, the SVP 2 sets into the LOOP 15 of the SCI 8 the data used for causing the IR 13 in each of PEs 1-0, 1-1, 1-3, . . . , 1-n to output the data read from the ROM 12 to the tuning scan loop 11 (designated by arrow ③ shown in FIG. 6).

The data set in the LOOP 15 are distributed to the IR 13 in each of PEs 1-0, 1-1, 1-3, . . . , 1-n selected by the USR 14 (designated by arrow ④ shown in FIG. 6), and the IR 13 of each of PEs 1-0, 1-1, 1-3, . . . , 1-n connects the tuning scan loop 11 to the ROM 12.

Subsequently, the SVP 2 sets the length of the tuning scan loop 11 corresponding to the version number to the BCR 16 of the SCI 8 as the amount of data shift (designated by arrow ⑤ shown in FIG. 6). The SVP 2 instructs the SCI 8 to shift the tuning scan data into the tuning scan loop 11. Upon receipt of the instruction, the SCI 8 shifts the tuning scan data into the tuning scan loop 11 from the ROM 12 in each of PEs 1-0, 1-1, 1-3, . . . , 1-n, according to the data set in the BCR 16.

The clock tuning data are simultaneously shifted from the ROM 12 into the tuning scan loop 11 via the IR 13 in each of PEs 1-0, 1-1, 1-3, . . . , 1-n in the same group selected by the USR 14. In this way, the clock tuning processing is carried out in a group-by-group unit basis by means of the inter-unit broadcast.

Those operations are repeatedly carried out for all of the groups which were classified by the SVP 2 according to the version number of the PE, whereby all of the PEs in the computer system have finished undergoing the clock tuning processing.

As a result, the number of times the clock tuning processing is carried out for each PE in the computer system is minimized, and a reduction in the time required to carry out the clock tuning processing of the parallel processing computer system can be realized. In other words, when the computer system comprises PEs 1-0 to 1-n of different versions which have different numbers of clock tuning latches (i.e., different loop lengths), the clock tuning processing is carried out in groups of PEs having the identical version number (the same number of clock tuning latches) by means of the inter-unit broadcast. In consequence, it becomes possible to complete the clock tuning processing in a length of time corresponding to the number of groups forming the computer system.

Figure 7:
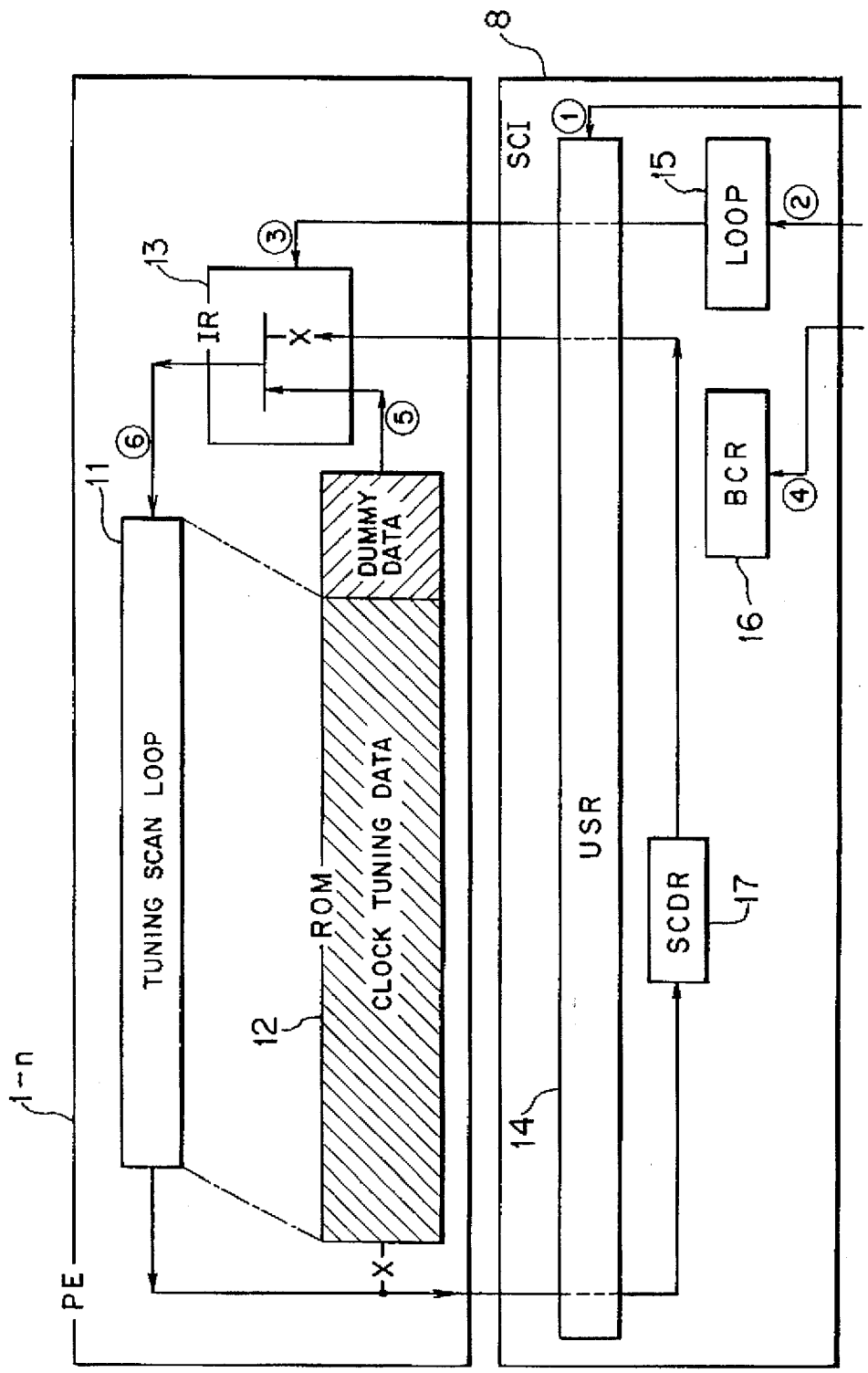
FIG. 7 is a block diagram for explaining the layout of data in the ROM and the flow of clock tuning data in the embodiment of the present invention.
Figure 8:
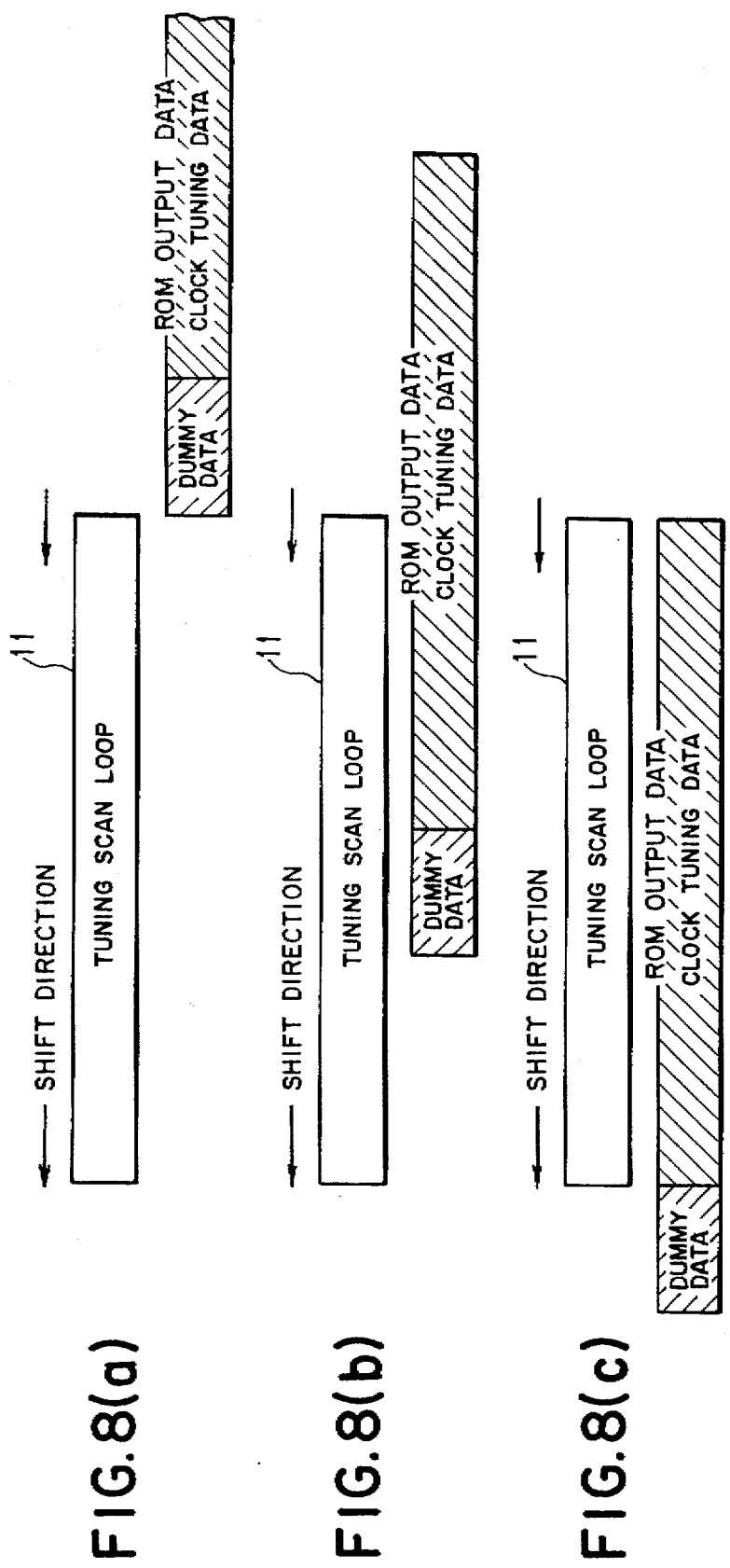
FIGS. 8(a) to 8(c) are diagrammatic representations for explaining the concept of distributing the ROM data to the tuning scan loop in the embodiment of the present invention.

FIG. 7 is a block diagram for explaining the layout of the data within the ROM 12 and the flow of the clock tuning data, provided that the ROM 12 of each PE has a data area larger than the number of data items of the tuning scan loop 11. Although FIG. 7 only shows the main portion of PE 1-n and the SCI 8, it goes without saying that the data are similarly laid out in the ROM 12 of another PE.

Figure 9:
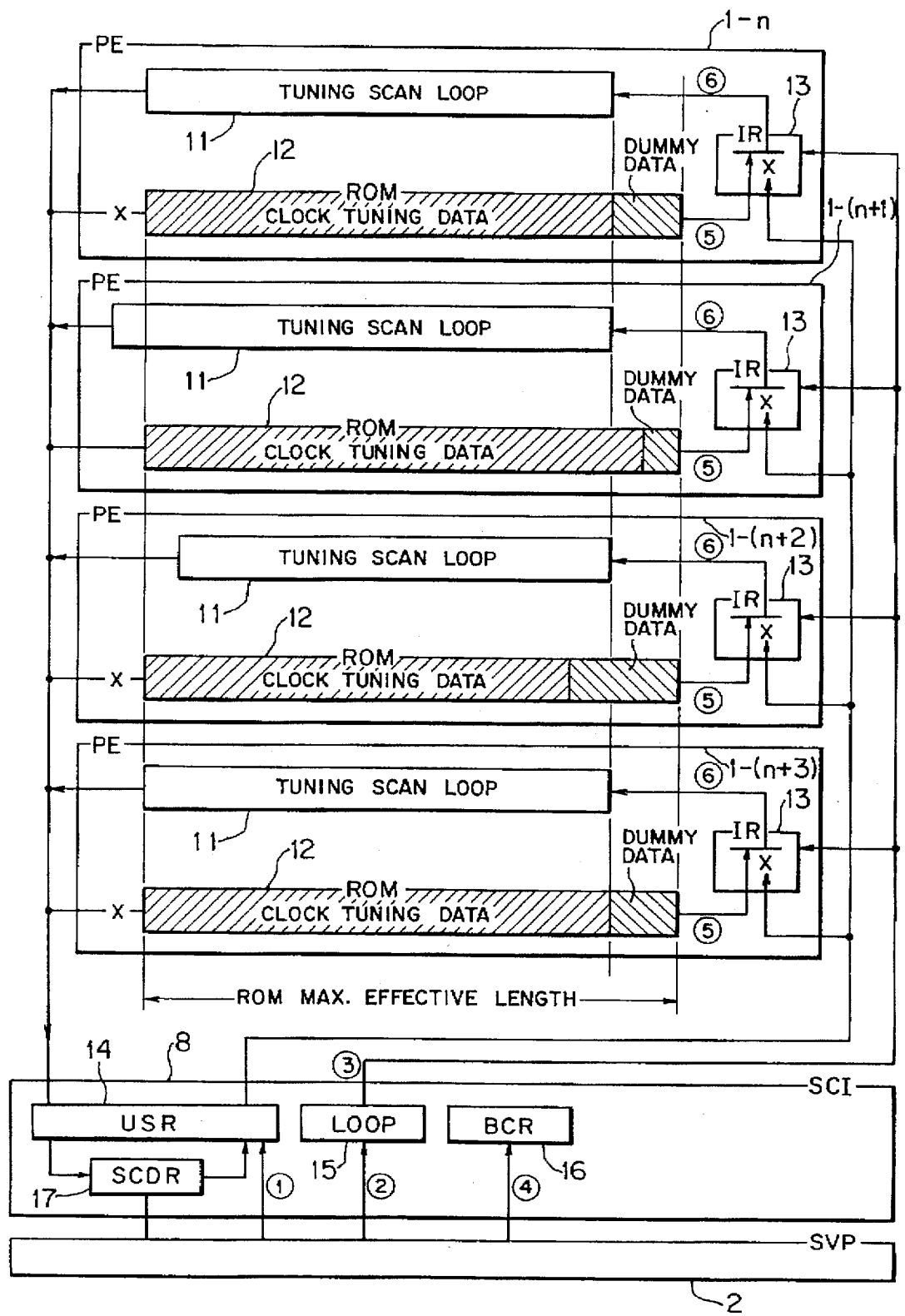
FIG. 9 is a block diagram for explaining the layout of the data in the ROM and connections between the tuning scan loops having different numbers of latches and the respective ROMs.

FIG. 9 shows the layout of the data in the ROM 12 of each PE, and connections between the tuning scan loops 11 having different numbers of latches and the respective ROMs 12. FIG. 9 shows four PEs 1-n, 1-(n+1), 1-(n+2), 1-(n+3) whose tuning scan loops 11 are different in length from each other.

Every ROM 12 mounted on each of PEs 1-0-1-n has an identical capacity, which is larger than the volume of the clock tuning data to be written into the tuning scan loop 11 (the amount of the loop or the number of clock tuning latches). More specifically, the capacity which is sufficient to reliably hold the clock tuning data.

As shown in FIGS. 7 and 9, a dummy area (dummy data) is placed at the leading end of the clock tuning data in the direction in which they are shifted from the ROM 12 into the tuning scan loop (i.e., at the leading end in the direction in which the clock tuning data are output), and the clock tuning data are placed and held in the ROM 12 such that they follows the dummy data.

The SVP 2 (not shown in FIG. 7) sets into the USR 14 of the SCI 8 the data used for selecting all PEs 1-0, . . . , 1-n, . . . , 1-(n+3) which constitute the computer system (designated by arrow ①) shown in FIGS. 7 and 9). Further, the SVP 2 sets into the LOOP 15 of the SCI 8 the data used for causing the IR 13 in each of PEs 1-0, . . . , 1-n, . . . , 1-(n+3) to output the clock tuning data from the ROM 12 to the tuning scan loop 11 (designated by arrow ②) shown in FIGS. 7 and 9).

The data set in the LOOP 15 are distributed to each of PEs 1-0, . . . , 1-n, . . . , 1-(n+3) selected by the USR 14 (designated by arrow ③) shown in FIGS. 7 and 9), and the IR 13 in each of PEs 1-0, . . . , 1-n, . . . , 1-(n+3) connects the tuning scan loop 11 to the ROM 12.

Subsequently, the SVP 2 sets in the BCR 16 of the SCI 8 a shift amount corresponding to the capacity of the ROM 12 (the maximum effective length) (designated by arrow ④) shown in FIGS. 7 and 9). The SVP 2 then instructs the SCI 8 to shift the clock tuning data from the ROM 12 to the tuning scan loop 11 in each of PEs 1-0, . . . , 1-n, . . . , 1-(n+3) according to the data set in the BCR 16.

As a result, in all of PEs 1-0, . . . , 1-n, . . . , 1-(n+3) selected by the USR 14, the clock tuning data read from the ROM 12 are successively shifted into the tuning scan loop 11 simultaneously via the IR 13, as shown in FIGS. 8(a), 8(b), and 8(c) in a state in which the dummy data are placed at the leading end of the clock tuning data (designated by arrows 5 and 6 shown in FIGS. 7 and 9).

Figure 10:
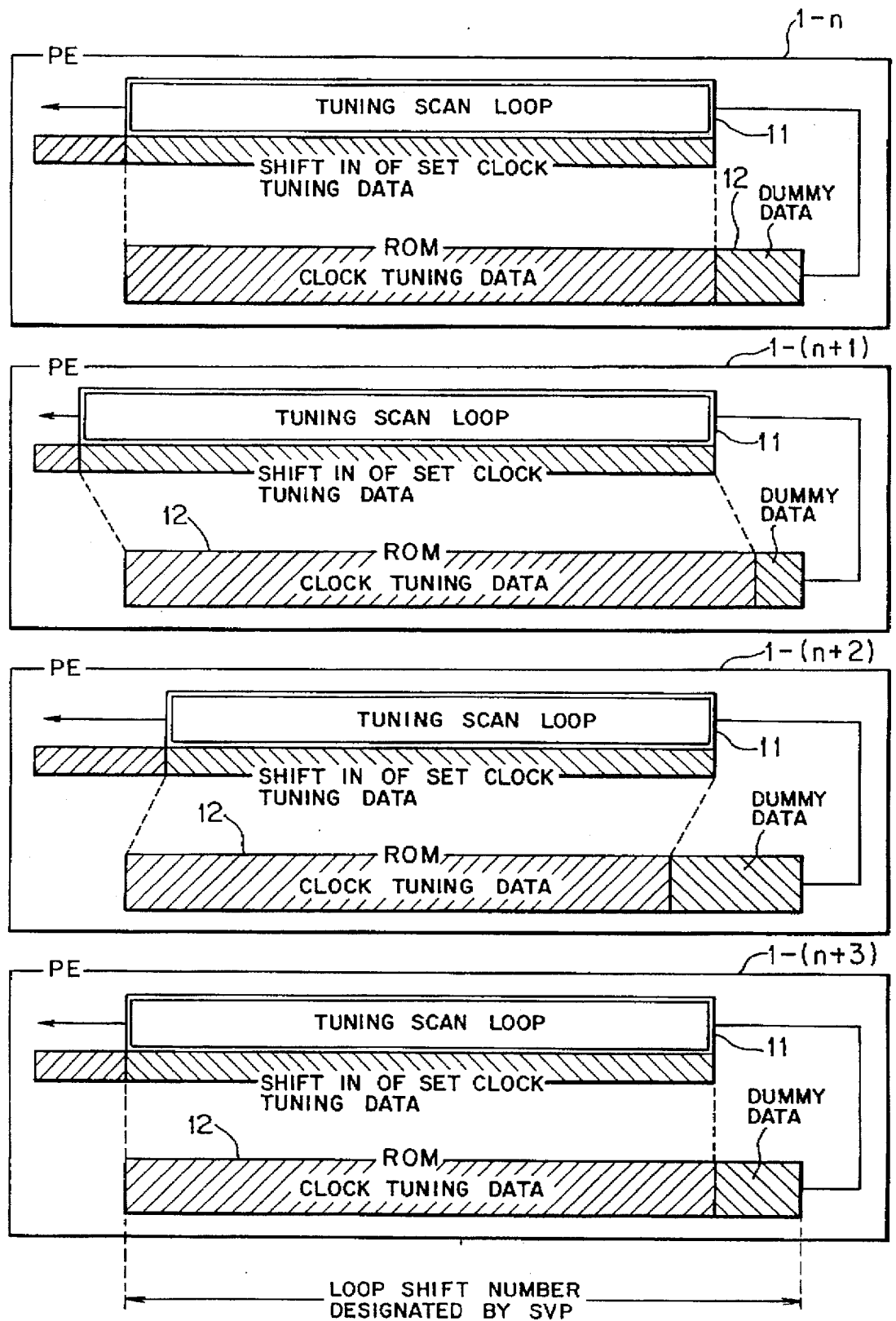
FIG. 10 is a block diagram for explaining the concept of distributing the ROM data to the tuning scan loops having different numbers of latches by means of a broadcast to each of units in the embodiment of the present invention.

At this time, the shift amount of the data is determined by the capacity of the ROM 12, irrespective of the length of the tuning scan loop 11. Therefore, at the moment the clock tuning data are shifted by an amount corresponding to the capacity of the ROM 12, the dummy data placed at the leading end of the data read out from the ROM 12 pass the tuning scan loop 11 and are shifted to a position where they are pushed out from the tuning scan loop 11, as shown in FIG. 8(c) and FIG. 10. Eventually, the clock tuning data stored in the ROM 12 to follow the dummy data come to a proper position in the tuning scan loop 11.

As shown in FIG. 7, the dummy data are shifted out from the loop 11 and enter the SCDR 17. However, since the LOOP 15 sets the IR 13 in such a way that the data from the ROM 12 are shifted into the tuning scan loop 11, the dummy data are prevented from being shifted again into the tuning scan loop 11 from the SCDR 17.

In this way, the capacity of the ROM 12 of each PE is made the same, and the clock tuning data are stored in the ROM 12 to follow the dummy data. Accordingly, as shown in FIGS. 9 and 10, the SVP 2 sets in the BCR 16 the amount of shift of the clock tuning data which corresponds to the capacity of the ROM 12. Therefore, even if the tuning scan loop 11 of each of PEs 1-0, . . . , 1-n, . . . , 1-(n+3) has a different length for reasons of a difference in the version number, it is possible to latch the tuning scan data delivered from the ROM 12 at the proper position in the tuning scan loop 11 in each of PEs 1-0, . . . , 1-n, . . . , 1-(n+3).

Specifically, as a result of the capacity of the ROM 12 in each of PEs 1-0, . . . , 1-n, . . . , 1-(n+3) of the computer system being made the same, it becomes totally unnecessary for the SVP 2 to allow for a difference in the loop length caused by a difference in the version number. Therefore, even if the computer system comprises a mixture of PEs 1-0, . . . , 1-n, . . . , 1-(n+3) of different version numbers which have different numbers of clock tuning latches, it is possible to carry out the clock tuning processing within a constant period of time (i.e., a time equal to the time required for a single PE to carry out the clock tuning processing) by means of the inter-unit broadcast.

What is claimed is:

1. A parallel processing computer system having a plurality of constituent units which include a processing unit, and a service processor for carrying out control for maintenance and operation of these constituent units, wherein each of the constituent units comprises a tuning scan loop formed as a result of continuously connecting together a plurality of clock tuning latches into which predetermined clock tuning data are set; a non-volatile memory into which the clock tuning data inherent to each constituent unit is stored; and a connecting mechanism which responds to an instruction from said service processor so as to connect said non-volatile memory to said tuning scan loop and successively send said clock tuning data from said non-volatile memory to said tuning scan loop, and said service processor is provided with a broadcast designating mechanism for simultaneously designating a plurality of constituent units which are to be subjected to clock tuning processing.

2. The parallel processing computer system according to claim 1, wherein a tuning file is previously stored in a recording medium controlled by said service processor, said tuning file consisting of unit designating information representing a constituent unit, among said plurality of constituent units, which is to have its clock tuning data rewritten, and rewrite clock tuning data for the constituent unit corresponding to said unit designating information;

the service processor is provided with a data replacement instruction mechanism for instructing the constituent unit corresponding to the unit designating information in said tuning file to replace clock tuning data, which had been read from said non-volatile memory and has been latched in said respective clock tuning latches, with rewrite clock tuning data for the corresponding constituent unit stored in said tuning file; and when said each constituent unit receives said data replacement instruction, said connecting mechanism of said constituent unit successively sends said rewrite clock tuning data, which have been received from said service processor, to said tuning scan loop.

3. The parallel processing computer system according to claim 2, wherein said non-volatile memory provided in each of said plurality of constituent units has an identical capacity larger than the volume of said clock tuning data to be written into said tuning scan loop; and said clock tuning data are arranged and stored in said non-volatile memory of said each constituent unit such that they follow dummy data disposed at the leading end of a data area of said non-volatile memory from which reading of data is started.

4. The parallel processing computer system according to claim 1, wherein said non-volatile memory provided in each of said plurality of constituent units has an identical capacity larger than the volume of said clock tuning data to be written into said tuning scan loop; and said clock tuning data are arranged and stored in said non-volatile memory of said each constituent unit such that they follow dummy data disposed at the leading end of a data area of said non-volatile memory from which reading of data is started.

5. The parallel processing computer system according to claim 1, wherein unit version information file related to the version number of said each constituent unit is stored in a recording medium controlled by said service processor; and said service processor groups said plurality of constituent units according to the version number of said each constituent unit stored in said unit version information file, and said broadcast designating mechanism is operated so as to simultaneously designate said constituent units on a group-by-group basis.

6. A constituent unit for a parallel processing computer system which acts as one of elements constituting the parallel processing computer system, said constituent unit comprising:

a tuning scan loop formed as a result of continuously connecting together a plurality of clock tuning latches into which predetermined clock tuning data are to be set;

a non-volatile memory into which clock tuning data inherent to said constituent unit is stored in advance; and a connecting mechanism which responds to an instruction from a service processor for carrying out control for maintenance and operation of said parallel processing computer system so as to connect said non-volatile memory to said tuning scan loop and successively send said clock tuning data from said non-volatile memory to said tuning scan loop.

7. The constituent unit for a parallel processing computer system according to claim 6, wherein when a data replacement instruction is received from said service processor, said instruction instructing replacement of clock tuning data, which had been read out from said non-volatile memory and have been latched in said respective clock tuning latches, with predetermined rewrite clock tuning data, said connecting mechanism successively sends said rewrite clock tuning data, which have been received from said service processor, to said tuning scan loop.

8. The constituent unit for a parallel processing computer system according to claim 7, wherein said non-volatile memory has a capacity larger than the volume of said clock tuning data to be written into said tuning scan loop; and said clock tuning data are arranged and stored in said non-volatile memory such that they follow dummy data disposed at the leading end of a data area of said non-volatile memory from which reading of data is started.

9. The constituent unit for a parallel processing computer system according to claim 6, wherein said non-volatile memory has a capacity larger than the volume of said clock tuning data to be written into said tuning scan loop; and said clock tuning data are arranged and stored in said non-volatile memory such that they follow dummy data disposed at the leading end of a data area of said non-volatile memory from which reading of data is started.

10. A clock tuning method for a parallel processing computer system which has a plurality of constituent units including a processing unit, and a service processor for carrying out control for maintenance and operation of these constituent units, said method comprising the steps of:

providing, in each of said constituent units, a tuning scan loop formed as a result of continuously connecting together a plurality of clock tuning latches into which predetermined clock tuning data are to be set, and a non-volatile memory into which said clock tuning data inherent to each constituent unit is stored in advance;

simultaneously designating by said service processor a plurality of constituent units to be subjected to clock tuning processing; and in each of said designated constituent units, successively sending said clock tuning data from said non-volatile memory to the respective clock tuning latches which form said tuning scan loop.

11. The clock tuning method for a parallel processing computer system according to claim 10, wherein a tuning file is previously stored in said service processor, said tuning file including unit designating information representing a constituent unit, among said plurality of constituent units, which is to have its clock tuning data rewritten, and rewrite clock tuning data for the constituent unit corresponding to said unit designating information;

a data replacement instruction is issued from said service processor to the constituent unit corresponding to the unit designating information in said tuning file after the clock tuning data in said non-volatile memory have been written into said respective clock tuning latches in each of the constituent units; and in the constituent unit which has received said data replacement instruction, the clock tuning data of said non-volatile memory latched in said respective clock tuning latches are replaced with rewrite clock tuning data for the constituent unit stored in said tuning file.

12. The clock tuning method for a parallel processing computer system according to claim 11, wherein said non-volatile memory provided in each of said plurality of constituent units has an identical capacity larger than the volume of said clock tuning data to be written into said tuning scan loop; and said clock tuning data are arranged and stored in said non-volatile memory of said each constituent unit such that they follow dummy data disposed at the leading end of a data area of said non-volatile memory from which reading of data is started.

13. The clock tuning method for a parallel processing computer system according to claim 10, wherein said non-volatile memory provided in each of said plurality of constituent units has an identical capacity larger than the volume of said clock tuning data to be written into said tuning scan loop; and said clock tuning data are arranged and stored in said non-volatile memory of said each constituent unit such that they follow dummy data disposed at the leading end of a data area of said non-volatile memory from which reading of data is started.

14. The clock tuning method for a parallel processing computer system according to claim 10, wherein unit version information file related to the version number of said each constituent unit is stored in said service processor; and said service processor groups said plurality of constituent units according to the version number of said each constituent unit in said unit version information file, whereby said constituent units to be subjected to said clock tuning processing are simultaneously designated on a group-by-group basis from the side of said service processor.

* * * * *